(12) United States Patent
Aschbrenner et al.

(10) Patent No.: US 6,463,205 B1
(45) Date of Patent: Oct. 8, 2002

(54) PERSONALIZED VIDEO STORY PRODUCTION APPARATUS AND METHOD

(75) Inventors: Scott Warren Aschbrenner, Davie; Craig Michael Oberfield; Mark Kerry Bender, both of Cooper City; Stephanie Rebecca Algie, Sunrise, all of FL (US)

(73) Assignee: Sentimental Journeys, Inc., Davie, FL (US)

( * ) Notice: Subject to any disclaimer, the term of this patent is extended or adjusted under 35 U.S.C. 154(b) by 0 days.

(21) Appl. No.: 08/221,210

(22) Filed: Mar. 31, 1994

(51) Int. Cl.⁷ .......................... H04N 5/93; G11B 27/00
(52) U.S. Cl. ...................................... 386/52; 386/98
(58) Field of Search .................. 358/335, 311, 358/906; 348/143, 158, 159, 207; 364/300; 360/14.1, 14.2, 14.3, 13; 386/4, 12, 98, 52, 80

(56) References Cited

U.S. PATENT DOCUMENTS

| | | | | |
|---|---|---|---|---|
| 4,688,105 A | * | 8/1987 | Bloch et al. ............... | 358/335 |
| 4,789,907 A | * | 12/1988 | Fischetti et al. ........... | 360/33.1 |
| 4,835,626 A | * | 5/1989 | Wilkinson et al. ......... | 360/14.3 |
| 4,965,673 A | * | 10/1990 | Bozzo et al. ............... | 358/335 |
| 5,003,411 A | * | 3/1991 | Nagahara et al. .......... | 360/72.2 |
| 5,012,334 A | * | 4/1991 | Etra .......................... | 358/102 |
| 5,036,472 A |   | 7/1991 | Buckley et al. ............ | 364/479 |
| 5,099,337 A |   | 3/1992 | Cury .......................... | 358/335 |
| 5,140,414 A | * | 8/1992 | Mowry ....................... | 358/81 |
| 5,231,512 A | * | 7/1993 | Ebihara et al. ............. | 358/335 |
| 5,231,517 A | * | 7/1993 | Taguchi ..................... | 358/453 |
| 5,237,648 A | * | 8/1993 | Mills et al. ................. | 395/133 |
| 5,278,662 A | * | 1/1994 | Womach et al. ............ | 358/335 |
| 5,283,819 A | * | 2/1994 | Glick et al. ................ | 379/90 |
| 5,377,319 A | * | 12/1994 | Katahara et al. ........... | 395/161 |
| 5,388,197 A | * | 2/1995 | Rayner ...................... | 395/154 |
| 5,469,536 A | * | 11/1995 | Blank ........................ | 395/131 |
| 5,623,587 A |   | 4/1997 | Bulman ..................... | 395/135 |

OTHER PUBLICATIONS

David Vincent, Nassau Landscaping Before and After, Oct. 1993.*

* cited by examiner

*Primary Examiner*—David Vincent
(74) *Attorney, Agent, or Firm*—Gifford, Krass, Groh, Sprinkle, Anderson & Citkowski, PC

(57) ABSTRACT

Personalized video stories are produced. Unfinished stories are first recorded on a video medium with blank segments. Digital sequences are used to complete the segments, for example, by portraying a character with a keyed-out facial area, using the digitized image of a subject to complete the character. An edit list is also prepared to locate the blank segments. The story is sequentially advanced to each segment in accordance with the edit list and, at each segment, the personalized sequence is recorded, thereby completing the story as though the subject is a character in the story. A plurality of different stories may be prerecorded, each substantially completed but including a plurality of unfinished segments. The stories may include animation, for example in the form of cartoons, the personalizes being recorded onto the previously uncompleted tape in such a way that a smooth, visual transition is realized at the start and ending of each segment. In addition to the merging of personalized imagery, the invention also accommodates audio, including narration, and textual information, such as personalized captioning. The apparatus will also print a customized label to produce an entirely personalized end product.

16 Claims, 3 Drawing Sheets

PERSONALIZED VIDEO STORY PRODUCTION APPARATUS AND METHOD

FIELD OF THE INVENTION

This invention relates generally to video production, and, in particular, to a system and methods which personalize a pre-recorded video story having unfinished segments using captured imagery, sound, or other effects.

BACKGROUND OF THE INVENTION

It is now possible to personalize certain consumer products once constrained to having a dedicated message. Hallmark Cards, for example, now provides a computer-controlled machine for vending personalized greeting cards. As described in U.S. Pat. No. 5,036,472, this system, configured in the form of a kiosk, provides specific instructions to a customer so, as to personalize a greeting card with the name and birthdate of an intended receiver, the name of the sender, and so forth. The data entering mode may further include operations for viewing and correction of the entered data. Upon final approval, a product handling mechanism prints the customized card and transfers the finished item to a delivery receptacle.

Additionally Hallmark is now advertising a greeting card that may be customizable with sound. In this product, a voice is recorded during a record mode and stored in a solid-state integrated circuit supported within the card. Following this record mode, when the recipient opens the card, the person hears a replay of the greeting previously stored by the sender.

In addition to the personalization of greeting cards and other communications products available in printed form, it would be advantageous and entertaining to provide video based materials having a personalized format. However, compared to the customization of a greeting card, the customization of a video-based product, including both motion imagery and sound recording, presents serious technical challenges. On the one hand, it is readily possible to produce an entirely customized video, but this requires uninitiated participants to become actors and, as anyone skilled in the art of video production is aware, very few people are capable of spontaneously performing in a way which will sustain the interest of an intended audience for any length of time. As a consequence, a system that relies entirely upon the operator for a performance will undoubtedly suffer from poor quality. Also, the recording of a completely customized video product requires that the recording process consume as much time or more than final playback, which may be unsuitable for certain consumer applications, including kiosk-like installations.

U.S. Pat. No. 5,099,337 "Method And Apparatus For Producing Customized Video Recordings" illustrates the degree of sophistication required in a system capable of producing an entirely customized video recording. This patent teaches audio/video reproduction equipment for displaying prompt information, including an audio signal used for synchronization. A first video signal representative of background information and a second video audio signal are combined along with creative modifications which may be subsequently added. The purpose of this prior-art system is not to reduce the demands on the performer, but rather to provide a smaller, more manageable apparatus which will create an open atmosphere for a more or less professional recording.

There is therefore remaining a need for a method and apparatus for producing customized video recordings which place less responsibility on the individual acting as the object of the personalization. This could be carried out by providing a non-personalized base video recording, for example in the form of a story with pre-existing characters and voice tracks, but with one or more segments being left unfinished for personalization purposes. With a sufficiently straightforward human interface, such a system would allow completely unsophisticated performers, including children, to personalize the final product. Also, by intentionally personalizing only a portion of the entire production, less time should be required for recording than for playback.

SUMMARY OF THE INVENTION

The present invention provides apparatus and methods for the efficient production of personalized video stories. The method includes the steps of prerecording a non-personalized video story having one or more uncompleted segments to be personalized. An edit list is also prepared to locate each uncompleted segment. Digital sequences are personalized, and the non-personalized story is sequentially advanced to each segment in accordance with the edit list and, at each segment, the personalized sequences are recorded to complete the story.

In a preferred embodiment the method is used to produce a personalized video product, for example a video tape in cassette form, though other formats, including CD-ROMs, are equally applicable. A plurality of different stories may be prerecorded, each substantially completed but including at least one unfinished segment. A separate edit list is prepared and stored for each story so as to locate the unfinished segments for that story. The stories may include animation, for example in the form of cartoons. The digitized sequences are stored to complete the segments in a particular story, the sequences including, for example, the representation of a character in the story. A visual template to personalize the character is also preferably made available.

Having selected an uncompleted story, personalizing information is captured and merged with the sequences to complete each unfinished segment. As an example, the facial likeness of a subject may be captured and aligned relative to a character in the story using the template so as to give the character the likeness of the subject. The personalized sequences are recorded within each unfinished segment of the prerecorded video story in accordance with the edit list for that story, thereby completing the story in such a way that a viewer is left with the impression that the subject appears to be a character in the story. The segments are recorded onto the previously uncompleted tape so that a smooth visual transition is realized at the start and ending of each segment. In addition to imagery, the invention also accommodates personalized audio, including narration, and textual information, such as captioning.

DETAILED DESCRIPTION OF THE PREFERRED EMBODIMENTS

The present invention provides hardware apparatus and methods whereby a pre-recorded video story may be personalized by combining live or digitally captured images to segments of the pre-recorded story. In addition to personalized imagery, the system, which will subsequently be described in detail, is adaptable to the inclusion personalized sound effects, narration, dialog or music. The system is additionally capable of including captioning such as an individual's name or other information as part of the personalization of the underlying video story, as well as the printing of labels for attachment to the final product.

Figure 1:
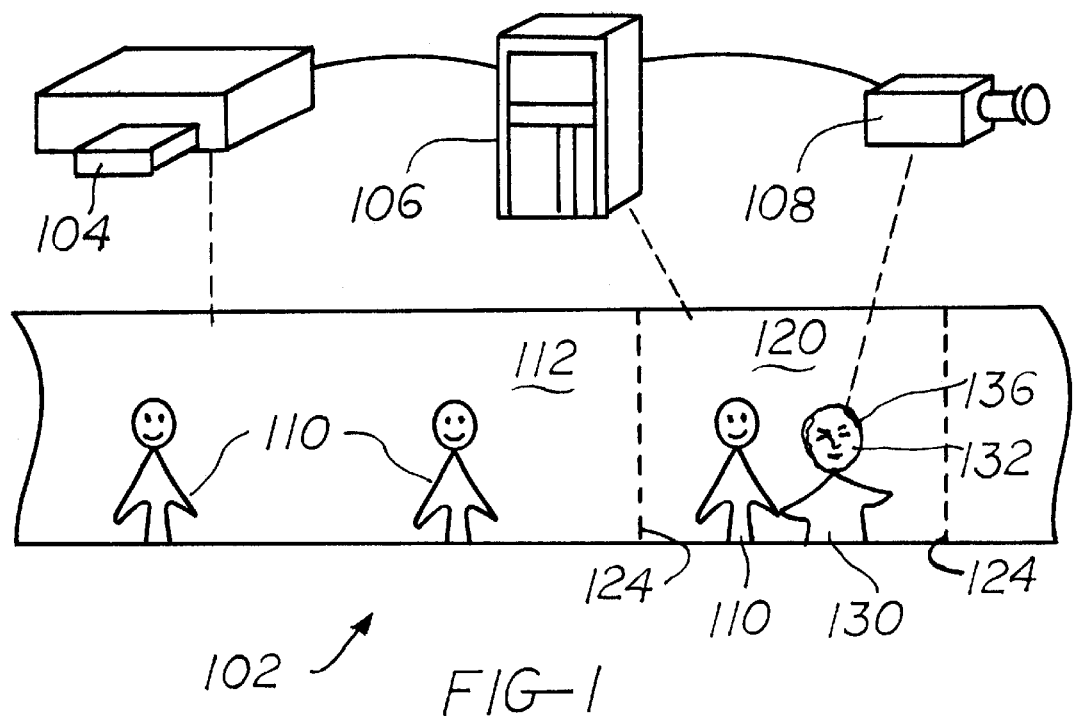
FIG. 1 shows, in highly schematic form, a sequence of images including a pre-recorded, non-personalized portion and a segment personalized in accordance with the present invention.

FIG. 1 shows in schematic form a video story to illustrate certain of the functions performed in accordance with the method aspect of the present invention. Although images are shown on a tape-like format, this should not be construed to imply that the invention manipulates movie film, but rather magnetic video tape, in which case the characters could not actually be seen without the aid of a tape deck and display device. FIG. 1 is used only to show how the story is personalized from a conceptual point of view.

The story, indicated generally at 102, includes a non-personalizable portion 112 having a character 110. For example, this character may form part of a video story in cartoon format, though the present invention is not limited to such animation, and may be used in conjunction with any previously recorded video programming. Along with the non-personalizable portion 112 there are one or more personalized segments such as that shown at 120, and defined within hypothetical broken lines 124. Within this segment 120, character 110 may remain, and a new character 130 may be added, including a personalizable area in the form of a template 136 through which an image associated with a particular individual may be imposed, in this case the image of an individual's face 132, captured with camera 108 and digitized.

Broadly, the video story 102 with non-personalizable portions is made available on a video medium such as a tape 104 prior to the personalization process. An edit list is also prepared for each story, enabling a apparatus to accurately and efficiently advance to each personalizable segment 120 through the use of associated time codes. During personalization, the video tape is played, preferably using a fast transport mode, to each of the personalizable segments 120 using the time codes. Further discussions of this process will be provided below, but in general, once the personalizable segment 120 has been reached the contents of segment 120 are made available as a digital sequence within computer 106, with the image 132 introduced into the area 136 using a template. The sequence and image, along with other optional personalization elements, including sound, narration, dialog, music and so forth, are recorded onto the tape until the end of the personalizable segment 120 is reached, at which time the tape is again advanced to the next personalizable segment, at which point a process identical to that just described is performed, the combination of the non-personalizable portions 112 in conjunction with the personalizable segments 120, once completed, forming a final, personalized video product.

Although FIG. 1 shows a face 132 being inserted into the personalizable segment 120, templates may be provided of any size to accommodate any aspect associated with personalization, including a subject's torso, appendages, full body, and so forth. Additionally, the process is not limited to people, as the image of a pet or even inanimate object may alternatively be used. The only assumption is that the recipient will recognize that the finished video product contains one or more unique segments of significance.

Various trade-offs are made in accordance with the invention in order to speed up the personalization process. The first such trade-off has already been described, that is, the use of one or more short segments as a personalization vehicle, as opposed to a personalization of the entire final product. The use of such segments streamlines the personalization process considerably, since the apparatus of the invention may rapidly advance on a, segment-by-segment basis, with segment recording limited to these times. This has the advantage of realizing a recording time equal to preferably one-half or less of the final playback time. In the event that the apparatus is installed in a commercial area, for example as an independent kiosk or as an operator-attended utility, this time efficiency serves to ensure that a potential customer will have sufficient patience to wait for the final product.

On the other hand, in those situations where the user or customer is willing to remain and participate in the entire recording process, the present invention may-be used to personalize a pre-recorded story having very long segments, or one in which the entire story is personalized. In this case, an unrecorded area such as aperture 136 in FIG. 1 would be provided throughout the story and the customer would remain in a specified area while the person's face, body, etc. is continuously recorded and used to fill the unrecorded aperture. In this alternative embodiment of the invention, feedback means would be, provided continuously to ensure that the individual remains in the correct area so as to fill or personalize the story in a visually pleasing manner.

Various other types of user interaction are also possible. For example, the selection of a pre-recorded non-personalized story and/or aspects relating to the stored digital sequences may be partially or entirely automated in accordance with characteristics derived with regard to the user. For example, certain types of non-personalized stories may be made available in accordance with the user's age or other characteristics, interests or desires. Alternatively, depending upon the same or other physical characteristics or attributes, the digital sequences may be selected or used in a particular way. Assuming a non-personalized story has, say, 10 unfinished segments, there may be more, less or exactly 10 digital sequences available in computer memory for use in completing the segments. Depending upon derived user characteristics, through a fill-in card, touch screen or direct input, a particular subset of the total available sequences might be selected accordingly. As just one example of many, if the subject is a young boy, sequences most appropriate for such an individual might be automatically selected and incorporated into the story. In general, the use of the digital sequences within the stories is intentionally very flexible, and, as will be mentioned later, a sequence might be repeated or looped during the recording of a segment, using, for example, a one second sequence 10 times in order to fill a 10 second segment. Various other alternatives are possible, including the ability to have the template remain in the same place from segment to segment, or chance size and position during a segment or between segments. Although the non-personalized video stories are preferably provided with unfinished segments which are blank, they need not be entirely blank, depending upon the technology. For example, a pre-recorded sound track may continue through a visually blank sample and remain non-personalized. Alternatively, using a personalized audio input, a blank segment may be entirely personalized, both in terms of audio and visual effects, including. text. As a further alternative, depending upon the technology available, an uncompleted segment need not be entirely visually blank, That is, with the ability to digitize a tape section and re-record that section in real time, it should be possible to provide non-personalized video stories wherein only a very small aspect or portion of the segment requires personalization, such as only the facial area. For example, with a non-personalized video story provided in digital form such as on a CD-ROM, such an exacting mode of personalization might be possible though not practical on another medium, such as video tape.

Figure 2:
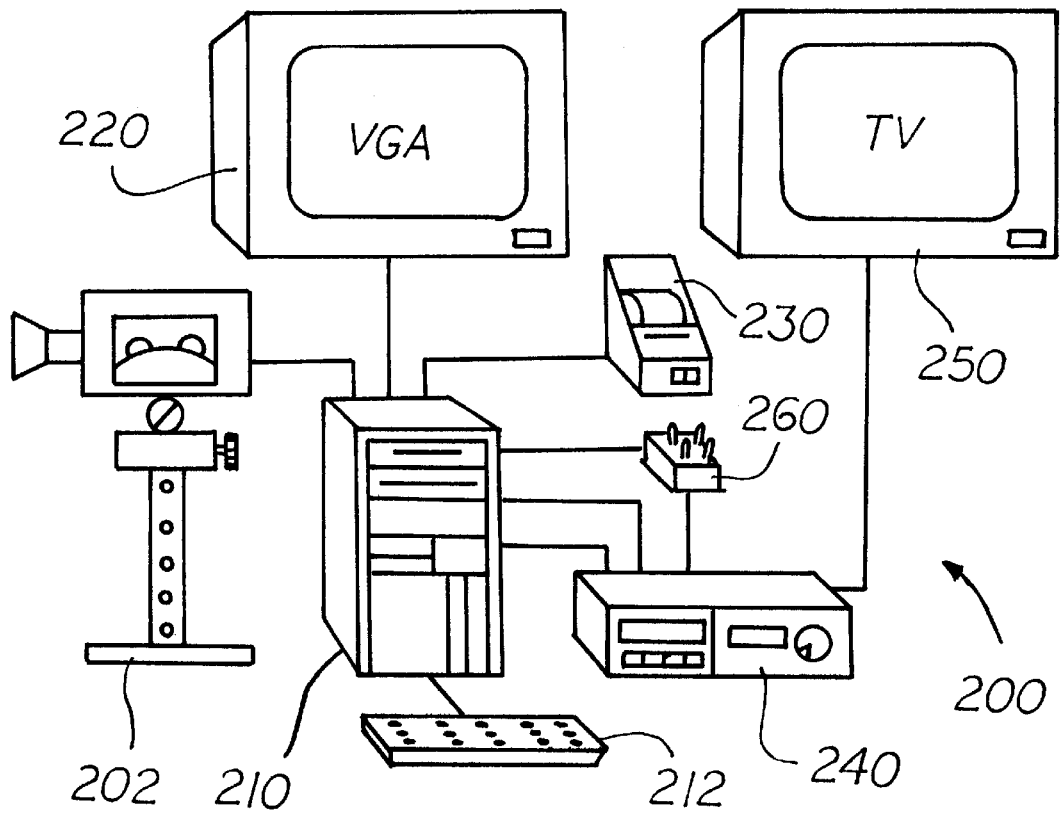
FIG. 2 is a drawing which illustrates, in oblique view, hardware components associated with the present invention which may be used to produce a personalized video.

Now turning to FIG. 2, there is shown at an oblique angle the various hardware components which form the apparatus aspect of the invention. Although these devices are shown in a somewhat exploded view, in practice, they would preferably be made more compact for commercial arrangements, particularly in a kiosk-like embodiment, in which case only those machines or controls necessary for operation might be exposed.

Video camera 202 is used to capture the image of the person or object to be used for personalization purposes. In the event that a flat image is to be used for such personalization, camera 202 may be replaced with a scanner, graphical input device and so forth. The camera 202 is interfaced to a central computer 210 having a keyboard 212, this computer 210 being responsible for the various editing and control features necessary to carry out personalization and product packaging related activities associated with producing a final video product. Keyboard 212 may be customized or replaced with any type of input device, including a touch screen, voice input, etc. Preferably, the computer is an IBM-compatible unit such-as a 486-based personal computer having sufficiently large random-access memory and hard-drive storage, though any machine of sufficient processing power may be used.

The image captured by camera 202 is digitized by computer 210 and this digitized image along with the digitized personalizable segments may be viewed on one or more of the monitors. It is well understood to those skilled in the art of computer graphics that VGA, which stands for "video graphics array," is a standard interface. Frame buffering is also well known. A label printer 230 is optionally provided to prepare customized labels for attachment to the final package. A VTR 240 is used to play the pre-recorded story, which may be viewed on NTSC monitor 250. VTR 240 is also used for the recording of the personalized segments stored and manipulated using computer 210. A VITC/SMPTE time code unit 260 is preferably used to instruct inventive software to locate the unpersonalized segments on the pre-recorded video tape. The software then instructs the edit controller 330 which, in turn interfaces with the VCR 240. Both VITC and SMPTE time-code formats are well known to those skilled in the art of video or image processing.

Figure 3:
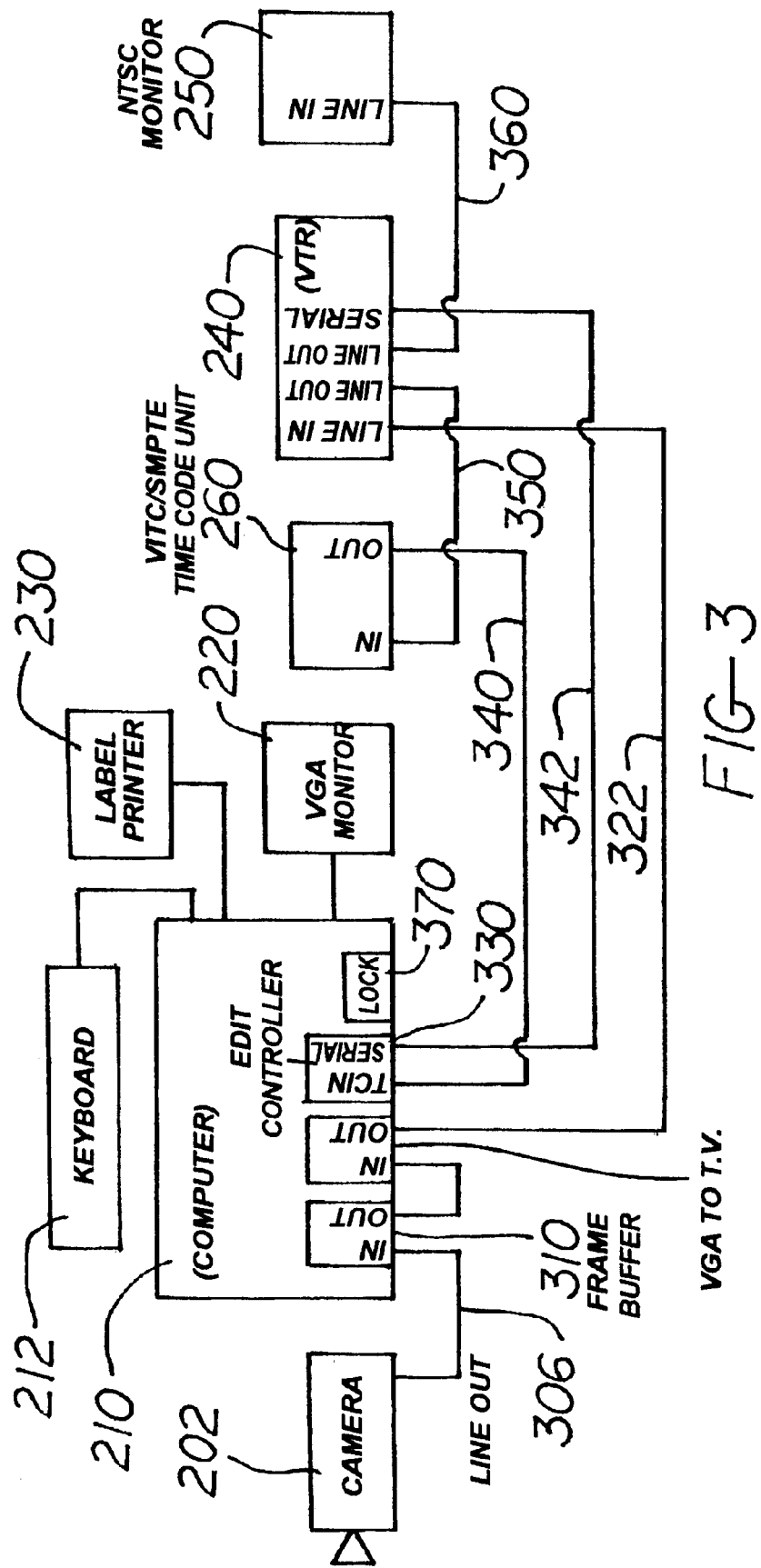
FIG. 3 depicts the hardware components of FIG. 2 in block-diagram form.

FIG. 3 is a block diagram showing the hardware components of FIG. 2 including the physical connections made to the various pieces of equipment. The video signal from camera 202 is fed along line 306 to frame buffer 310, preferably a model True Vision Targa 16/32 unit, though any suitable frame buffer may be used. The signal from the captured frame then put to a VGA-to-TV Genlock card, preferably a True Vision Model Video VGA 1-megabyte unit, which provides a synchronized signal along line 322 for use by VTR 240. Again, any such Genlock synchronization interface may be used, the Genlock standard for video synchronization also being well known in the art. An edit controller 330, implemented, for example with a Future Video Edit Link-2000 or Video Media's PCT and CX, accepts time control input along line 340 and control signals along five-pin serial path 342. The time codes are provided through any commercially available VITC/SMPTE time-code converter unit 260, receiving VITC codes from one output of the VTR 240 along line 350. Another output of VTR 240 may be used to monitor the non-personalizable story and the recording of the customized segments through the use of monitor 250, receiving composite video along line 360.

Also shown in FIG. 3 is lock device 370, which may be installed on computer 210 to monitor the number of personalized videotapes produced in accordance with the present invention. Such an arrangement might be particularly useful in the event that the system depicted in FIG. 3 is installed in a commercial environment, in which case it might be necessary for the purposes of royalty payments, leasing, and so forth to keep track of how many personalized video products have been produced. In this case software resident on computer 210 may be encrypted with the key associated with encryption being under the control of lock device 370 which also keeps a running tab of end product produced. In the event that this system has produced a predetermined number of personalized products in accordance with some form of accounting, lock device 370 may remove the decryption key within computer 210, thus defeating its operation until such time that the account is made current. Lock device 370 may be associated with hardware as well as software and may include any type of lock out, so long as it serves its intended purpose of ensuring that customized products according to the present invention are not produced unless they are paid for.

Figure 4:
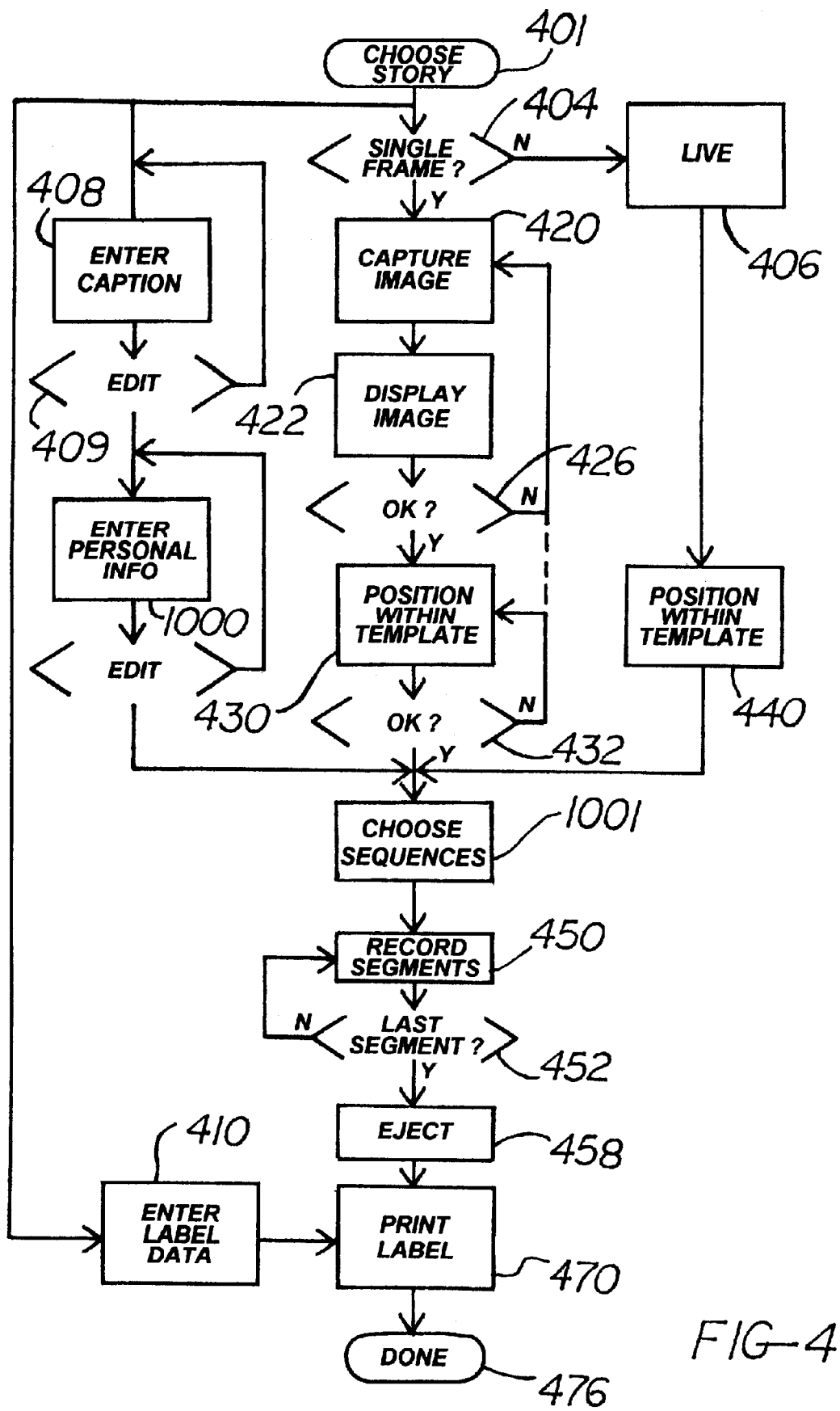
FIG. 4 is a flow diagram used to depict major operational steps taken during the production of a personalized video story.

Now turning to FIG. 4, there is shown a flowchart of steps taken in accordance with a preferred method aspect of the invention. Beginning at start block 401, a determination is first made at step 404 concerning whether this will be a single-frame digitized sequence, whether through a frame grabber, scanning, and so forth. In the event that it is to be a single frame or digitized sequence personalization, the image is captured at step 420. However, in the event of a live personalization, a path is taken through step 406 instead. Also, at any time before the personalization process, a caption may be entered at step 408 and edited as shown at step 409. Furthermore, at any point prior to final packaging, label data may be entered at step 410. At step 1000 personal information (e.g., male/female) may be entered to aid in choosing digitized sequences at 1001.

After the image capture step 420, the image is displayed at step 422, for example on VGA monitor 220. Feedback is preferably initiated at step 426, allowing subsequent image captures to take place in the event the user or customer is not satisfied with a particular image. Once acceptable, a template is brought up at step 430 and the captured image is displayed within the template. Again, an iterative loop is preferably provided whereby the user or customer may continue the positioning process until satisfied.

The recording of the segments takes places at step 450. In the event that caption data have been entered at step 408 and edited at step 409 this information is now made available in computer memory for the record segment step 450. In the event that this is to be a live personalization, an interactive positioning within the template takes place at step 440 during the recording of the segments. Using inventive software, the story to be personalized is preferably selected from a database of stories, and a series of edits are initiated through the use of a previously created edit list associated with the story chosen. During step 450, the previously recorded videotape with VITC time code which is to receive the personalizing segments are placed into the VTR 240. The software then instructs the VTR, through VITC time code via a VITC-to-SMPTE converter unit 260, to locate the first segment to be personalized on the pre-recorded videotape.

The edit controller board 330 is used to automatically insert the captured image into the digitized sequence and personalize that segment. To save memory requirements, segment recording may be done in a looping fashion whereby the personalization may be continuously written during segment recording. This is acceptable in many cases, especially cartoons, wherein repeating sequences such as galloping horses, running figures, moving backgrounds, and so forth, are generally already presented in repeating fashion. The software then tells the VTR through the VITC time code unit to locate the next blank segment on the video tape, again through the use of the edit controller board. This process continues in a similar fashion for the duration of the edit list until the last segment is reached at step 452. Upon completion, the system prompts the VTR to rewind and the tape, which is ejected at step 458. At step 470, the label printed via step 410 may be applied to the of the package, thus completing the entire personalized video product delivery at step 476.

Having thus described our invention, we claim:

1. The method of producing a personalized video story having a playback speed, comprising the steps of:
   (a) prerecording a non-personalized video story having one or more uncompleted segments requiring personalization onto a single video recording medium;
   (b) preparing an edit list associated with the non-personalized video story for use in locating each uncompleted segment;
   (c) providing a personalized video sequence;
   (d) automatically advancing to each uncompleted segment in accordance with the edit list at a rate in excess of the playback speed; and
   (e) recording the personalized sequence directly onto, the recording medium to complete each segment.

2. The method of claim 1, wherein the step of providing a personalized video sequence includes:
   providing a video sequence including an unfinished portion;
   capturing personalizing imagery relating to a personality; and
   inserting the personalizing imagery into the unfinished portion.

3. The method of claim 2 wherein the personalizing imagery is a still image.

4. The method of claim 2 wherein the personalizing imagery includes capturing a motion image.

5. The method of claim 1, wherein the step of providing a personalized video sequence includes providing text.

6. The method of claim 1, wherein the step of providing a personalized video sequence includes providing personalized audio.

7. The method of producing a personalized video story, comprising the steps of:
   (a) prerecording a video story onto a single recording medium, the story having a finished portion and a plurality of blank segments, the playback time of a blank segment being substantially shorter than the playback time of the finished story;
   (b) preparing an edit list associated with the location of each blank segment on the recording medium;
   (c) storing a digital sequence associated with the completion of a blank segment;
   (d) capturing an image of a subject;
   (e) merging the image of the subject with the stored digital sequence to provide a personalized sequence for use in completing a blank segment;
   (f) automatically advancing to a blank segment of the prerecorded video story in accordance with the prepared edit list at a rate in excess of the playback time;
   (g) filling the blank segment by recording the personalized sequence provided in step (e) directly onto the recording medium; and
   repeating steps (f) and (g) for each segment in turn, completing the story in such a way that the subject appears to be a character in the story.

8. The method of claim 7, including an animated video story.

9. The method of claim 7, step (e) including the step of digitally keying out a portion of the stored digital sequence so that image of the subject appears within the digitally keyed-out portion.

10. The method of claim 9, the size and position of the keyed-out portion being substantially similar in each segment as the segments are replayed.

11. The method of claim 9, the image of the subject including a facial likeness.

12. The method of claim 7, further including the steps of:
   capturing personalized textual information; and
   merging the personalized textual information with the stored sequence.

13. The method of claim 7, further including the steps of:
   capturing a personalized sound track; and
   merging the personalized sound track with the stored sequence.

14. The method of claim 7, step (a) further including the steps of:
   prerecording a plurality of unpersonalized video stories, each such story having a finished portion and a plurality of blank segments; and
   choosing one of the unpersonalized video stories for personalization.

15. The method of claim 7, further including the steps of:
   completing the video story in the form of a video tape;
   providing a package for the tape; and
   printing a label associated with the personalized video story for affixation to the package.

16. The method of producing a personalized video cassette, comprising the steps of:
   (a) prerecording a plurality of animated video stories on video tape, each story being substantially completed, but including a plurality of unfinished segments;
   (b) preparing an edit list for each story, each edit list indicating the location of the unfinished segments for that story;
   (c) storing digital sequences for each story which may be used to complete the unfinished segments, the sequences including the representation of a character in the story, and a visual template which may be used to personalize the character;
   (d) choosing one of the unfinished animated video stories;
   (e) capturing the facial likeness of a subject and a storing digital information representative of the facial likeness;
   (f) aligning the facial likeness within the sequence using the template for the selected story so as to give the character the likeness of the subject; and
   (g) advancing to each unfinished segment of the prerecorded video story in accordance with the edit list for that story at a rate higher than the playback rate of the story when finished, and completing each segment in such a way that the subject appears to be a character therein.

\* \* \* \* \*

UNITED STATES PATENT AND TRADEMARK OFFICE
CERTIFICATE OF CORRECTION

PATENT NO. : 6,463,205 B1
DATED : October 8, 2002
INVENTOR(S) : Scott Warren Aschbrenner It is certified that error appears in the above-identified patent and that said Letters Patent is hereby corrected as shown below:

<u>Title page,</u>
Item [57], ABSTRACT,
Line 14, replace "personalizes" with -- personalizations --.

<u>Column 1,</u>
Line 17, replace "so,as" with -- so as --.

<u>Column 3,</u>
Line 8, replace "inclusion" with -- inclusion of --.
Line 42, replace "a apparatus" with -- an apparatus --.

<u>Column 4,</u>
Line 10, replace "a, segment" with -- a segment --.
Line 22, replace "may-be" with -- may be --.
Line 30, replace "be, provided" with -- be provided --.

<u>Column 5,</u>
Line 1, replace "including. text" with -- including text --.
Line 3, replace "blank," with -- blank --.
Line 32, replace "such-as" with -- such as --.

<u>Column 6,</u>
Line 54, replace "places" with -- place --.

<u>Column 7,</u>
Line 17, delete "the of"
Line 32, replace "onto," with -- onto --.

UNITED STATES PATENT AND TRADEMARK OFFICE
CERTIFICATE OF CORRECTION

PATENT NO. : 6,463,205 B1
DATED : October 8, 2002
INVENTOR(S) : Scott Warren Aschbrenner It is certified that error appears in the above-identified patent and that said Letters Patent is hereby corrected as shown below:

Column 8,
Line 55, replace "a storing" with -- storing --.

Signed and Sealed this

Seventeenth Day of June, 2003

JAMES E. ROGAN
*Director of the United States Patent and Trademark Office*